United States Patent
Vare et al.

(10) Patent No.: US 10,187,821 B2
(45) Date of Patent: Jan. 22, 2019

(54) METHOD FOR WIRELESS DATA OFFLOAD

(71) Applicant: Teleste Oyj, Littoinen (FI)

(72) Inventors: Jani Vare, Kaarina (FI); Kari Virtanen, Naantali (FI); Kimmo Ylander, Forssa (FI)

(73) Assignee: Teleste OYJ, Littoinen (FI)

( * ) Notice: Subject to any disclaimer, the term of this patent is extended or adjusted under 35 U.S.C. 154(b) by 0 days.

(21) Appl. No.: 15/759,666

(22) PCT Filed: Sep. 14, 2015

(86) PCT No.: PCT/FI2015/050606
§ 371 (c)(1),
(2) Date: Mar. 13, 2018

(87) PCT Pub. No.: WO2017/046440
PCT Pub. Date: Mar. 23, 2017

(65) Prior Publication Data
US 2018/0199237 A1    Jul. 12, 2018

(51) Int. Cl.
*H04W 28/08* (2009.01)
*H04W 84/00* (2009.01)

(52) U.S. Cl.
CPC .......... *H04W 28/08* (2013.01); *H04W 84/005* (2013.01)

(58) Field of Classification Search
CPC ..... H04W 4/06; H04W 28/08; H04W 84/005; H04W 84/12; H04W 16/00; H04W 36/08; H04W 36/14; H04W 36/22; H04W 36/24; H04W 36/30; H04W 36/32; H04W 88/08; H04W 8/24; H04L 12/145; H04L 41/0896; H04N 21/21805; H04N 21/239; H04N 21/2408; H04N 21/242
See application file for complete search history.

(56) References Cited

U.S. PATENT DOCUMENTS

| 9,910,705 B1* | 3/2018 | Mak | G06F 21/57 |
| 2009/0106436 A1* | 4/2009 | Andersson | H04L 45/00 709/230 |

(Continued)

FOREIGN PATENT DOCUMENTS

| CN | 103529811 | 1/2014 |
| EP | 2709336 | 3/2014 |

(Continued)

OTHER PUBLICATIONS

Written Opinion dated Jan. 27, 2016 from PCT Application No. PCT/FI2015/050606, 6 pages.

*Primary Examiner* — Afsar M Qureshi
(74) *Attorney, Agent, or Firm* — Hollingsworth Davis, LLC (57) ABSTRACT

A method and related apparatus for performing wireless data offload in a public transportation vehicle comprising at least one access point and at least one data storage comprising a plurality of pieces of data, the method comprising: searching for available offload nodes in the vehicle; sending a request for wireless offload of the data at least to a first offload node, the request including one or more offload parameters; offloading, upon an acknowledgement from the first offload node, a first piece of data to the first offload node; and registering the first piece of data as offloaded to the first offload node.

20 Claims, 4 Drawing Sheets

(56) References Cited

U.S. PATENT DOCUMENTS

2015/0208205 A1     7/2015  Chan et al.
2016/0378570 A1 *  12/2016  Ljubuncic ............. G06F 9/5027
                                                                718/104

FOREIGN PATENT DOCUMENTS

| WO | WO-2015044502 A1 * | 4/2015 | ............. H04H 20/62 |
| WO | WO2015069151 | 5/2015 | |
| WO | WO-2015069151 A1 * | 5/2015 | .......... B61L 15/0027 |
| WO | WO-2015103322 A1 * | 7/2015 | ............ H04M 15/80 |

* cited by examiner

METHOD FOR WIRELESS DATA OFFLOAD

TECHNICAL FIELD

The invention relates to wireless data offload systems.

BACKGROUND

Data offload generally refers to a transfer process of data that is temporally stored on a physical medium, such as a Network video recorder, to a desired destination upon detecting a suitable connection for the data transfer. The offload can be carried out wirelessly or with wired connection. The use of complementary or dedicated technology for the data offload purposes is especially advantageous in a situation where the data network resource allocated for the data delivery is about to reach its maximum capacity.

A specific challenge in wireless data traffic is the data delivery to and from mobile vehicles, especially public transportation vehicles, like trains, trams, metro trains and busses. A moving vehicle, as such, poses challenges to reliable data transfer, where the usable data rate typically reduces as a function of the speed of the vehicle. Many public transportation operators have started to offer a wireless data connection, such as a Wi-Fi connection, for the passengers to use during their trip. Moreover, the requirements for using video surveillance in public transportation vehicles are continuously increasing. The video data from a plurality of surveillance cameras, i.e. CCTV data, together with the data traffic of the passengers, easily amounts to an extensive quantity of data, which cannot be transferred within the capacity of current wireless networks without a significant delay.

Moreover, governmental regulations for keeping the CCTV data stored for a certain period, such as 14 days, pose challenges to both storing the data onboard and also carrying out wireless data offload efficiently, when the vehicle stops e.g. at a train station or a bus stop. The amount of data to be offloaded may be very large and a public transportation vehicle typically stops only for a short period. If the wireless offload is not successful or sufficiently comprehensive when stopped, the amount of non-offloaded CCTV data at the vehicle grows and may exceed the storage capacity of a network recorder of the vehicle. The problem becomes even more severe at long distance travels having stations or stops very sparsely.

SUMMARY

Now, an improved arrangement has been developed to reduce the above-mentioned problems. As different aspects of the invention, we present a method, a system, a mobile communication unit and an access point, which are characterized in what will be presented in the independent claims.

The dependent claims disclose advantageous embodiments of the invention.

The first aspect of the invention comprises a method for performing wireless data offload in a public transportation vehicle comprising at least one access point and at least one data storage comprising a plurality of pieces of data, the method comprising: searching for available offload nodes in the vehicle; sending a request for wireless offload of the data at least to a first offload node, the request including one or more offload parameters; offloading, upon an acknowledgement from the first offload node, a first piece of data to the first offload node; and registering the first piece of data as offloaded to the first offload node.

According to an embodiment, the method further comprises sending the registration to a data center being a destination of the offloaded first piece of data.

According to an embodiment, the method further comprises receiving an acknowledgement from the data center that the first piece of data has been successfully uploaded from the first offload node, and deleting the first piece of data from the data storage.

According to an embodiment, the method further comprises removing the registration and re-allocating the free data space of the first piece of data for storing subsequent offload data.

According to an embodiment, the method further comprises sending an acknowledgement associated with a reward to the first offload node.

According to an embodiment, the method further comprises upon a predetermined timer expiring or upon receiving an acknowledgement from the data center that the first piece of data has not been successfully uploaded from the first offload node, removing the registration and offloading the first piece of data to a second offload node.

According to an embodiment, the offload parameters comprise at least one of an amount of data to be offloaded and/or an estimate for duration of the offload.

According to an embodiment, the offload node is a portable data processing device comprising a memory and a transceiver for receiving and sending offload data.

According to an embodiment, the offload node either comprises an offload application or is registered in an offload service as an offload node.

According to an embodiment, the transmission between the access points in the vehicle and the offload nodes is carried out according to any of IEEE 802.11 standard series.

A second aspect of the invention includes a computer program product, comprising computer program code embodied on a computer readable medium, wherein said computer program code is, when executed on a processor of a computer, arranged to cause the computer to perform the method of any of the embodiments above.

A third aspect of the invention relates to a system comprising
 a public transportation vehicle comprising at least one access point, at least one data storage for storing a plurality of pieces of data and an offload management system; and
 a server implementing a data center comprising at least one data storage for storing corresponding plurality of pieces of data as said vehicle and an offload management system for keeping track of the offload pieces of data;
wherein the offload management system of the vehicle is arranged to search for available offload nodes in the vehicle; send a request for wireless offload of the data at least to a first offload node, the request including one or more offload parameters; offload, upon an acknowledgement from the first offload node, a first piece of data to the first offload node; and register the first piece of data as offloaded to the first offload node.

A fourth aspect of the invention relates to a server of a data center comprising at least one data storage for storing a plurality of pieces of data offload from offload nodes and an offload management system for keeping track of the offloaded pieces of data; wherein the offload management system is arranged to monitor whether an offload request is received from an offload node; check an identification of a piece of data associated with said offload request and an identification of the offload node; start reception of offload data from the offload node; and upon completing the reception of the offload data prior to expiration of a timer, register the offload process and send an acknowledgement to the origin of the offloaded piece of data and to the offload node.

According to an embodiment, said acknowledgement sent to the offload node is associated with a reward.

According to an embodiment, the offload management system is arranged to examine, on the basis of the checked offload request, whether the offload request has been expired; and if yes, disqualify the offload request and send an acknowledgement to the origin of the offloaded piece of data and to the offload node.

According to an embodiment, the offload management system is arranged to upon noticing that the reception of the offload has not been completed prior to the expiration of the timer, disqualify the offload request and send an acknowledgement to the origin of the offloaded piece of data and to the offload node.

BRIEF DESCRIPTION OF THE DRAWINGS

The invention will now be described in more detail in connection with preferred embodiments with reference to the appended drawings, in which.

DETAILED DESCRIPTION

Figure 1:
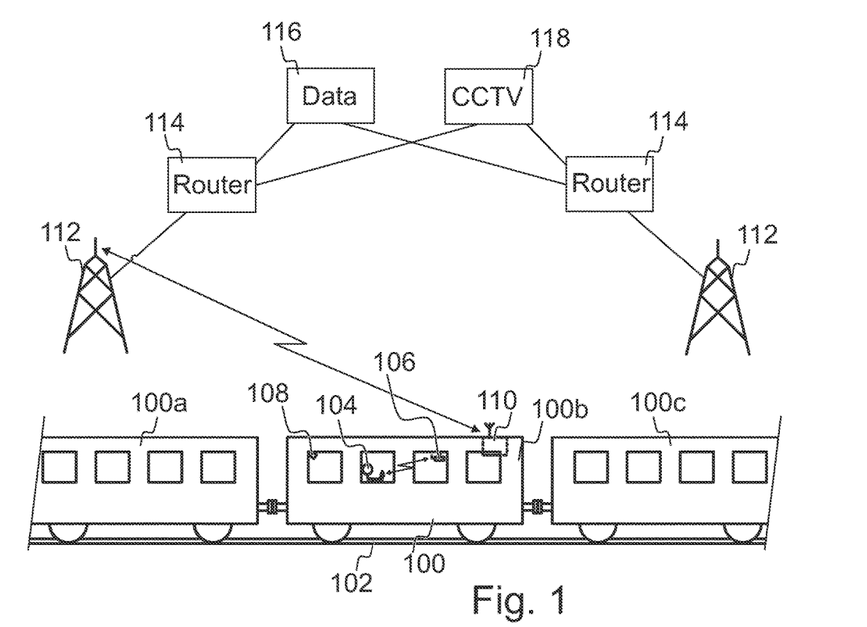
FIG. 1 shows a simplified example of the operating principle of a wireless data offload system.

FIG. 1 shows a simplified example of the operating principle of a wireless data offload system. FIG. 1 illustrates a rail traffic vehicle 100, such as a train, a tram or a metro train, travelling on the rails 102. The rail traffic vehicle 100 may comprise one or more cars 100a, 100b, 100c, etc., typically arranged to transport passengers. A wireless data connection, such as a Wi-Fi connection, may be offered for the passengers to be used during their trip. In FIG. 1, a passenger 104 uses his/her mobile device via a wireless connection provided by a wireless base station 106. Moreover, each car may include one or more surveillance cameras 108 capturing video surveillance data within the car. During the trip, especially the video surveillance data may amount to an extensive quantity of data.

The vehicle 100 comprises at least one mobile communication unit 110, which is arranged to communicate with at least one access point 112 arranged along a route of the vehicle 100. The mobile communication unit 110 is arranged to obtain data from one or more data sources, such as one or more surveillance cameras and/or one or more data terminals operated by passengers, arranged in functional connection with the mobile communication unit. The mobile communication unit 110 comprises a transmitter arranged to transmit the data to the access point 112.

A public transportation vehicle, such as a train, a tram, a metro train or a bus, is typically arranged to travel a predetermined route, whereby the system may comprise a plurality of access points arranged along said route. The access points may be positioned, for example, at the stations or in a depot where the vehicle is configured to stop, whereby the buffered video and/or user data may be transferred to the access point during the stoppage.

The access point 112 comprises a receiver arranged to receive the data, and it is further arranged to forward the data to a data target for decoding. The data targets may comprise, for example, a data communication network 116 and a video surveillance system 118, and the access point 114 may be arranged to forward the video data from said one or more surveillance cameras to the video surveillance system 118 and user data from said one or more data terminals operated by the passengers to the data communication network 116. The system may comprise one or more routers 114 arranged to route the data to an appropriate data target.

In many countries, the governmental regulations for using video surveillance in public transportation vehicles are continuously tightening. The video data from a plurality of surveillance cameras, i.e. CCTV data, together with the data traffic of the passengers, easily amounts to an extensive quantity of data. The mobile communication unit 110 may further comprise a video recorder arranged to buffer at least a part of the video data from said one or more surveillance cameras before transmission to the access point.

Moreover, there is a tendency in governmental regulations to increase the period for which the CCTV data needs to be stored to enable checking afterwards any incidents happened in the vehicle. The great amount of CCTV data may create problems both in storing the data onboard and also in carrying out wireless data offload efficiently, when the vehicle stops e.g. at a train station or a bus stop. The amount of data to be offloaded may be very large and a public transportation vehicle typically stops only for a short period. If the wireless offload is not successful or sufficiently comprehensive when stopped, the amount of non-offloaded CCTV data at the vehicle grows and may exceed the storage capacity of a network recorder of the vehicle.

Thus, there is a need for a solution for enhanced wireless data offload even in a situation where the network connection between the vehicle and the access points at the stations does not provide for sufficiently comprehensive offload process.

In order to alleviate these problems, a new method for wireless data offload is presented herein. The method is based on the idea that the wireless terminals of the passengers are used for assisting in the offload process such that the data to be offloaded is divided into pieces of data, which are offloaded to the wireless terminals, i.e. offload nodes. The passenger eventually leaves the vehicle, and upon finding a suitable network connection, the piece of data is uploaded to a data center storing the offloaded data. Thereupon, said piece of data may be deleted form the vehicle, and the passenger may be rewarded for completing the offload process regarding said piece of data.

Figure 2:
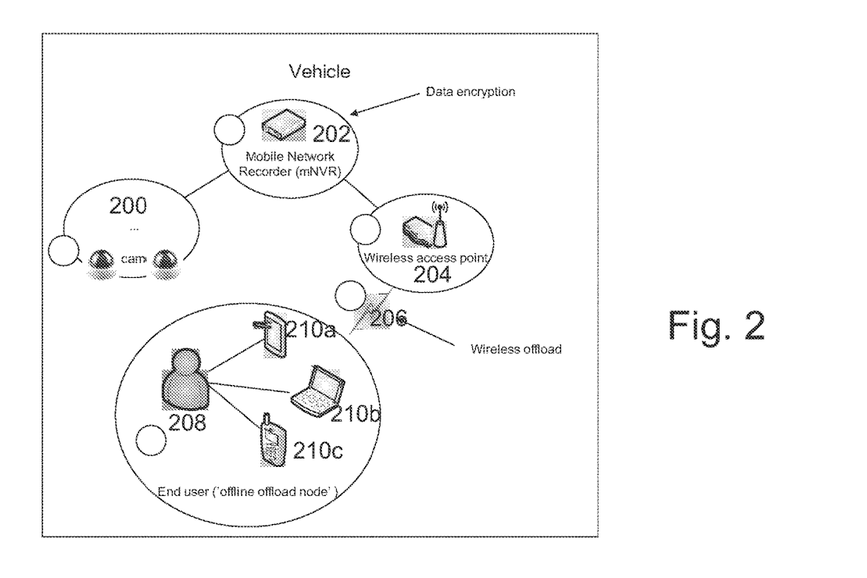
FIG. 2 shows an example of various elements in the vehicle for carrying out the wireless data offload according to an embodiment.

FIG. 2 illustrates an example of various elements in the vehicle for carrying out the wireless data offload according to an aspect. The one or more cars of the vehicle may each comprise one or more surveillance cameras 200. The vehicle comprises one or more mobile network video recorders (mNVR) 202 arranged to at least temporarily store the video data from said one or more surveillance cameras. The mNVR preferably carries out an encryption of the video data while storing it. Further, the one or more cars of the vehicle may each comprise one or more wireless access points 204. As mentioned above, the wireless access points may be used to offer a wireless network connection 206 for the passengers 208. The passengers may use their wireless terminals 210a, 210b, 210c, such as mobile and smart phones, tablets, laptops, etc., for up/downloading their personal data via the wireless connection. However, in view of the embodiments described herein below, the wireless terminals may be referred to as offload nodes, to which pieces of data from the mNVR may be offloaded.

Figure 3:
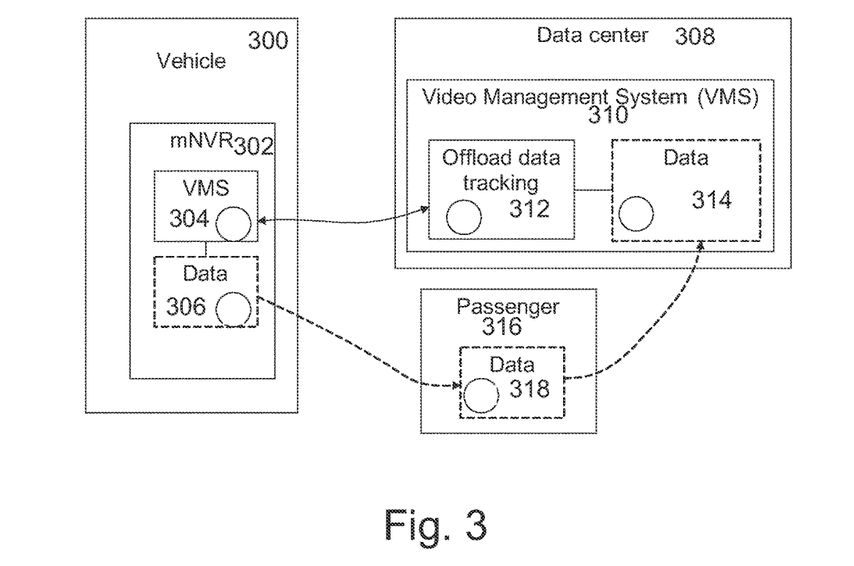
FIG. 3 shows an overall example of the offload system according to an embodiment.

FIG. 3 shows an overall example of the offload system according to an embodiment. It is obvious that the storage capacity of the mNVRs of the vehicles becomes easily fully used, and therefore they are not well-suited for a long-time storage of the video data. As shown in FIG. 3, the one or more mobile network video recorders (mNVR) 302 of the vehicle 300 comprise a respective part of the video management system (VMS) 304, i.e. an offload management system, and a data storage 306 for storing the CCTV data from the surveillance cameras, and possibly user data from the passengers. The server of the data center 308 comprises a video management system (VMS) 310 of its own, which in turn includes at least an offload management system 312, such as a computer program, for keeping track of the data offloaded from the vehicles, and a data storage 314 for storing the offload data received from the offload nodes. The user terminals of the passengers 316 operate as the offload nodes arranged to carry pieces of offload data in their memory 318.

Figure 4:
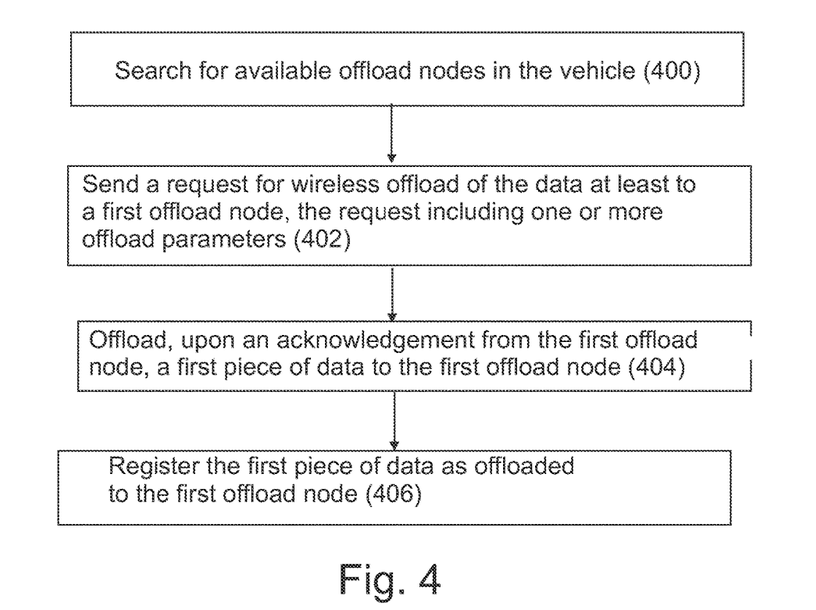
FIG. 4 shows a flow chart of a wireless offload process according to an embodiment.

A method according to a first aspect and various embodiments related thereto are now described by referring to the flow chart of FIG. 4. The method of FIG. 4 may be applied in the video management system (VMS) of the vehicle comprising at least one access point and at least one data storage comprising a plurality of pieces of data. The method comprises searching for (400) available offload nodes in the vehicle; sending (402) a request for wireless offload of the data at least to a first offload node, the request including one or more offload parameters; offloading (404), upon an acknowledgement from the first offload node, a first piece of data to the first offload node; and registering (406) the first piece of data as offloaded to the first offload node.

Thus, the VMS of the vehicle searches for available offload nodes, i.e. wireless terminals of the passengers, for assisting in the offload process. According to an embodiment, the offload node either comprises an offload application or is registered in an offload service as an offload node. Consequently, the VMS may search only for "official offload nodes", i.e. wireless terminals comprising the offload application or being registered in the offload service.

The search for offload nodes may comprise one or more offload parameters regarding the piece of data to be offloaded, on the basis of which the offload nodes (or their users) may decide whether to accept the request for the offload or not. According to an embodiment, the offload parameters may comprise at least one of an amount of data to be offloaded and/or an estimate for duration of the offload. Hence, the offload node may automatically determine whether there is enough free memory space in the terminal for the piece of data offered to be offloaded. On the other hand, the user of the offload node may decide on the basis of his/her remaining travel time and the estimate for duration of the offload whether there is enough time for offloading the data.

Upon receiving an acknowledgement from an offload node, the VMS offloads a piece of data to the identified offload node, and registers the offload of the particular piece of data to the identified offload node. Thus, the VMS may maintain a database where the ongoing offload processes are kept as long as an acknowledgement is received that the particular piece of data has been successfully uploaded to the data center.

According to an embodiment, the method may further comprise sending the registration to the data center being a destination of the offloaded first piece of data. The VMS of the vehicle may send the registration to the VMS of the data center so as to inform the data center that the first piece of data is expected to be uploaded in due course. Thus, in addition to the VMS of the vehicle, the VMS of the data center may also maintain a database about the ongoing offload processes.

According to an embodiment, the offload node is a portable data processing device comprising a memory and a transceiver for receiving and sending offload data. When the passenger carrying the first offload node leaves the vehicle, the memory contains the offloaded first piece of data. The offload node may start, either automatically or as prompted by the user, to search for a suitable network connection for uploading the first piece of data to the data center. Herein, the offload node may use any wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet. The offload node, for example the offload application therein, may comprise a list of the preferred order of network connection types to be used for the upload, thereby aiming to use e.g. the best available bandwidth or the cheapest connection.

According to an embodiment, the method may further comprise receiving an acknowledgement from the data center that the first piece of data has been successfully uploaded from the first offload node, and deleting the first piece of data from the data storage. Thus, when the VMS of the vehicle receives an acknowledgement that the first piece of data has been successfully stored in the data center, it is not necessary to store the corresponding first piece of data in the VMS of the vehicle any more, and it can be deleted.

According to an embodiment, the method may further comprise removing the registration and re-allocating the free data space of the first piece of data from the data storage of the vehicle for storing subsequent offload data. Thus, upon receiving the acknowledgement that the first piece of data has been successfully stored in the data center, the registration of the first piece of data to the first offload node can be removed from the VMS of the vehicle, and from the VMS of the data center, if stored there as well. Then the VMS of the vehicle knows that the free data space of the first piece of data can again be re-allocated to subsequent offload data from the surveillance cameras.

According to an embodiment, the method may further comprise sending an acknowledgement associated with a reward to the first offload node. For encouraging passengers to allow their terminals to be involved in the offload process, a reward or a bonus program may be provided to the passengers. Thus, when the first piece of data has been successfully uploaded to the data center by the first offload node, the VMS of the data center may send an acknowledgement indicating the reward to the first offload node. The reward may be, for example, bonus points stored in the offload application, and the passenger may use the bonus for purchasing various items with a reduced fee or even for free.

However, the uploading of the first piece of data from the first offload node to the data center may fail for some reason.

For example, the offload node may not find a suitable network connection, it may be switched off or run out of battery, or there may be network congestion on the found connection. Therefore, according to an embodiment, the method may further comprise, upon a predetermined timer expiring or upon receiving an acknowledgement from the data center that the first piece of data has not been successfully uploaded from the first offload node, removing the registration and offloading the first piece of data to a second offload node.

In other words, the VMS of the vehicle may comprise a timer running from the registration of the first piece of data to the first offload node, and if the VMS of the vehicle has not received any acknowledgement of the first piece of data being successfully uploaded to the data center when the timer reaches a predetermined threshold value, the VMS of the vehicle may interpret the offload process as failed. Instead of, or in addition to, the timer in the VMS of the vehicle, VMS of the data center may interpret the offload process as failed e.g. on the basis of its own timer expiring or due to detected network congestion. In response to interpreting the offload process as failed, the VMS of the data center may send an acknowledgement to the VMS of the vehicle about the failure. In either case, the VMS of the vehicle removes the registration of the first piece of data to the first offload node and starts to search for a second offload for offloading the first piece of data therein.

Figure 5A:
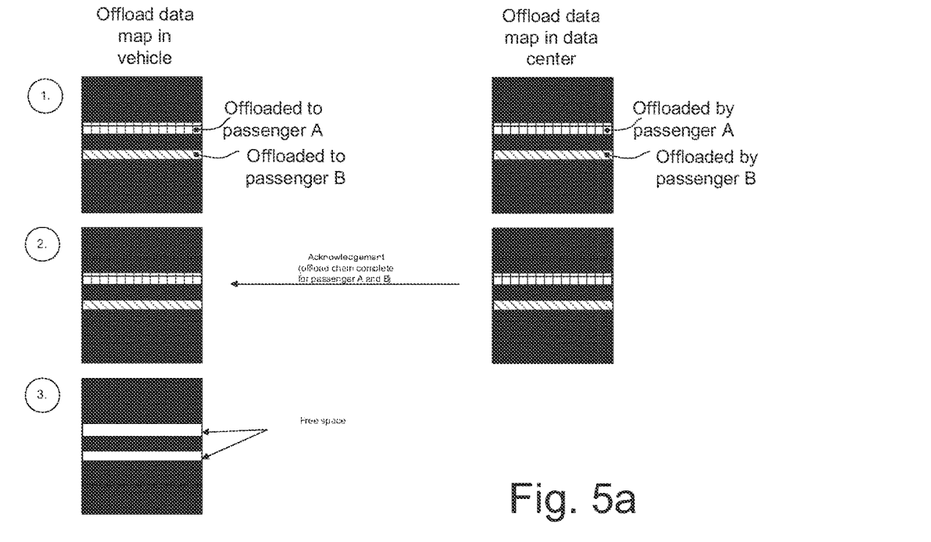
FIGS. 5a, 5b show an example of a successful and a partly unsuccessful offload process.
Figure 5B:
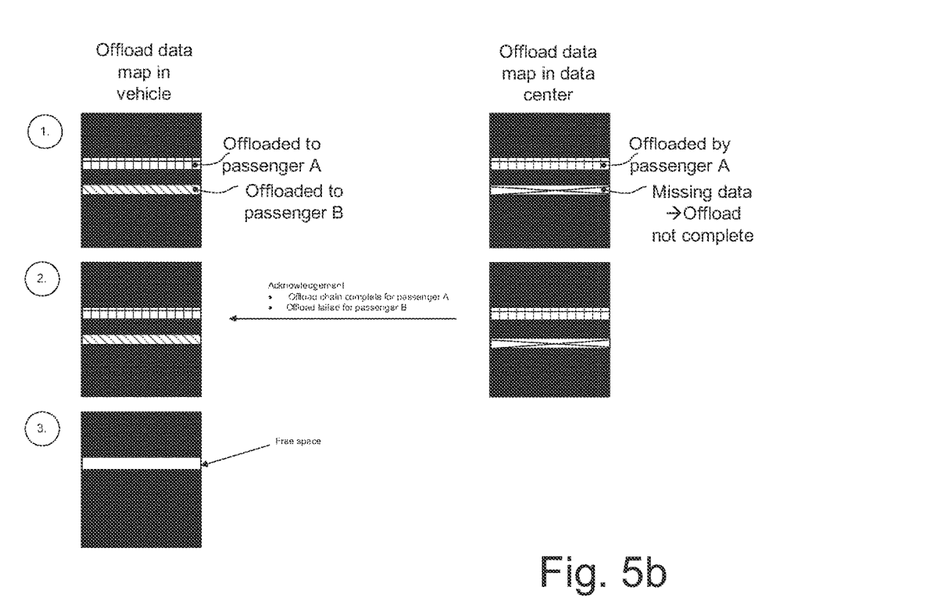

FIGS. 5a and 5b show an example of a successful and a partly unsuccessful offload process, respectively. FIG. 5a depicts an example of the mapping of the offload data between the vehicle and the data center, where passengers A and B refer to the offline nodes used to deliver the offloaded data to the data center. FIG. 5a shows three steps of the process as follows:
1) Two separate 'chunks' of data, i.e. a first and a second piece of data (shown with different shadings), are respectively offloaded to the passengers A and B inside the vehicle. When leaving the vehicle, the passengers A and B respectively offload the first and the second piece of data further to the data center either immediately after establishing a suitable network connection or at least before the expiration of the timer set for the data.
2) The data center sends an acknowledgement to the VMS of the vehicle and reports that offload of the first and the second piece of data has been completed successfully by the passengers A and B.
3) Upon receiving the acknowledgement, the VMS of the vehicle deletes the first and the second piece of data from the memory space of the mNVR and allocates the free space as available for subsequent offload data from the surveillance cameras.

FIG. 5b shows an example, which is otherwise similar to that of FIG. 5a, but here the passenger B fails to deliver the offload data, i.e. the second piece of data, prior to expiration of the timer and hence the offload of the passenger B is considered disqualified. The three steps of FIG. 5b are as follows:
1) Again, two separate 'chunks' of data, i.e. a first and a second piece of data (shown with different shadings), are respectively offloaded to the passengers A and B inside the vehicle. When leaving the vehicle, the passenger A offloads its data further to the data center prior to the expiration of the timer. However, the passenger B fails to offload its data prior to the expiration of the timer.
2) The data center sends an acknowledgement to the VMS of the vehicle and reports that offload has been completed successfully by the passenger A, whereas the passenger B has failed to offload data prior expiration and the second piece of data requires new offload allocation.
3) Upon receiving the acknowledgement, the VMS of the vehicle deletes only the first piece of data from the memory space of the mNVR and allocates the free space of the first piece of data as available for subsequent offload data from the surveillance cameras. However, for the offload of the second piece of data, the VMS of the vehicle starts to search for a new offload node.

Figure 6:
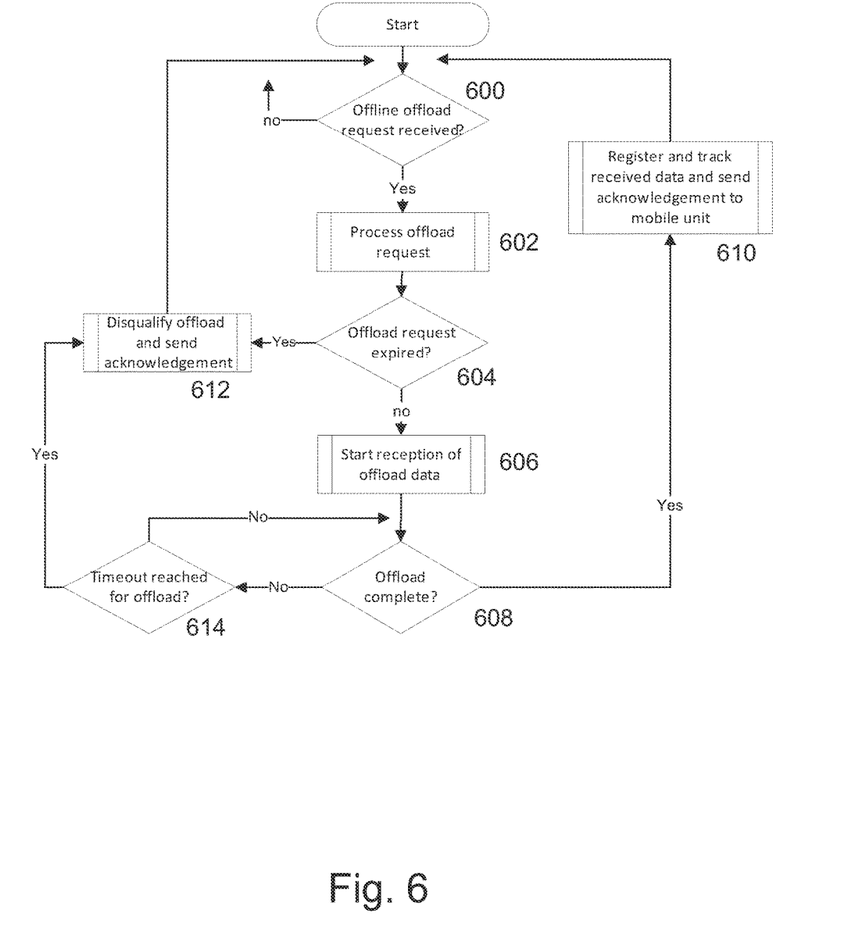
FIG. 6 shows a flow chart of an offload request handling process in a data center according to an embodiment.

FIG. 6 shows an example operation of the VMS of the data center in the offload request handling process according to an embodiment. In the beginning, the VMS monitors (600) whether an offline offload request is received from an offload node. When received, the VMS processes (602) the offload request, e.g. checks the identification of the piece of data and the identification of the offload node. On the basis of the checked request, the VMS examines whether the offload request has been expired (604). If not, the VMS starts (606) the reception of offload data from the offload node. The VMS monitors (608), if the reception of the offload is completed prior to the expiration of the timer. If yes, the offloaded data is registered and an acknowledgement is sent (610) to the VMS of the vehicle and to the offload node.

The offload process may be disqualified or interrupted at some instances of the process. At step 604 above, the VMS may notice that the offload request has been expired, and as a result, the offload is disqualified (612) and an acknowledgement is sent to the VMS of the vehicle and to the offload node. At step 608 above, the VMS may notice that the reception of the offload has not been completed prior to the expiration of the timer (614). As a result, the offload is disqualified and an acknowledgement is sent to the VMS of the vehicle and to the offload node according to the step 612 above.

While the above examples have been described by referring to CCTV data as the data to be offloaded, the embodiments herein are equally applicable to any data stored in a data storage of the vehicle. As mentioned above, the passengers may submit their user data to the data storage of the vehicle to wait for a suitable situation for offloading the user data to a network.

According to an embodiment, the transmission between the access points in the vehicle and the offload nodes is carried out according to any of IEEE 802.11 standard series. While various names and acronyms, such as WLAN, Wi-Fi, 802.11, etc. are used for wireless local area networks, they all typically refer to wireless access technology defined in IEEE standard series 802.11, including multiple versions of the IEEE 802.11, such as 802.11b, 802.11g, 802.11a, 802.11n, 802.11ac. It is, however, noted that the implementation of the embodiments disclosed herein are not limited to the WLAN technology according to any of IEEE 802.11 standard series only, but the embodiments may be applied to any similar wireless communication technology encountering the bandwidth sharing problem.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such non-transitory physical media as memory chips, or memory blocks implemented within the processor, magnetic media such as hard disk or floppy disks, and optical media such as for example DVD and the data variants thereof, CD.

A skilled man appreciates that any of the embodiments described above may be implemented as a combination with one or more of the other embodiments, unless there is explicitly or implicitly stated that certain embodiments are only alternatives to each other.

With the arrangement described above, the passenger, after having received offloaded data, literally carries the offloaded data out of the vehicle and finally delivers the offloaded data to the operator's back-end (data center) in an environment where there is a suitable network connection available. This allows constant offload even when there is no wireless network available outside the vehicle or the wireless network is insufficient for successful offload. Moreover, it allows an implementation of a very cost efficient offload system.

It will be obvious for a person skilled in the art that with technological developments, the basic idea of the invention can be implemented in a variety of ways. Thus, the invention and its embodiments are not limited to the above-described examples but they may vary within the scope of the claims.

The invention claimed is:

1. A method for performing wireless data offload in a public transportation vehicle comprising at least one access point and at least one data storage comprising a plurality of pieces of data, the method comprising:
   searching for available offload nodes in the vehicle;
   sending a request for wireless offload of the data at least to a first offload node, the request including one or more offload parameters;
   offloading, upon an acknowledgement from the first offload node, a first piece of data to the first offload node; and
   registering the first piece of data as offloaded to the first offload node.

2. The method according to claim 1, further comprising sending the registration to a data center being a destination of the offloaded first piece of data.

3. The method according to claim 1, further comprising receiving an acknowledgement from the data center that the first piece of data has been successfully uploaded from the first offload node, and
   deleting the first piece of data from the data storage.

4. The method according to claim 3, further comprising removing the registration and re-allocating the free data space of the first piece of data for storing subsequent offload data.

5. The method according to claim 3, further comprising sending an acknowledgement associated with a reward to the first offload node.

6. The method according to claim 1, further comprising upon a predetermined timer expiring or upon receiving an acknowledgement from the data center that the first piece of data has not been successfully uploaded from the first offload node,
   removing the registration and offloading the first piece of data to a second offload node.

7. The method according to claim 1, wherein the offload parameters comprise at least one of an amount of data to be offloaded and/or an estimate for duration of the offload.

8. The method according to claim 1, wherein the offload node is a portable data processing device comprising a memory and a transceiver for receiving and sending offload data.

9. The method according to claim 1, wherein the offload node either comprises an offload application or is registered in an offload service as an offload node.

10. The method according to claim 1, wherein the transmission between the access points in the vehicle and the offload nodes is carried out according to any of IEEE 802.11 standard series.

11. A computer program product, comprising computer program code embodied on a non-transitory computer readable medium, wherein said computer program code is, when executed on a processor of a computer, arranged to cause the computer to perform the method of claim 1.

12. A system comprising:
   a public transportation vehicle comprising at least one access point, at least one data storage for storing a plurality of pieces of data and an offload management system; and
   a server implementing a data center comprising at least one data storage for storing corresponding plurality of pieces of data as said vehicle and an offload management system for keeping track of the offload pieces of data;
   wherein the offload management system of the vehicle is arranged to
   search for available offload nodes in the vehicle;
   send a request for wireless offload of the data at least to a first offload node, the request including one or more offload parameters;
   offload, upon an acknowledgement from the first offload node, a first piece of data to the first offload node; and
   register the first piece of data as offloaded to the first offload node.

13. The system according to claim 12, wherein the offload management system of the vehicle is arranged to
   send the registration to the data center being a destination of the offloaded first piece of data.

14. The system according to claim 12, wherein the offload management system of the vehicle is arranged to
   receive an acknowledgement from the data center that the first piece of data has been successfully uploaded from the first offload node, and
   delete the first piece of data from the data storage.

15. The system according to claim 14, wherein the offload management system of the vehicle is further arranged to
   remove the registration and re-allocating the free data space of the first piece of data for storing subsequent offload data.

16. The system according to claim 14, wherein the offload management system of the data center is arranged to
   send an acknowledgement associated with a reward to the first offload node.

17. A server of a data center comprising at least one data storage for storing a plurality of pieces of data offload from offload nodes and an offload management system for keeping track of the offloaded pieces of data; wherein the offload management system is arranged to
- monitor whether an offload request is received from an offload node;
- check an identification of a piece of data associated with said offload request and an identification of the offload node;
- start reception of offload data from the offload node; and
- upon completing the reception of the offload data prior to expiration of a timer, register the offload process and send an acknowledgement to the origin of the offloaded piece of data and to the offload node.

18. The server according to claim 17, wherein said acknowledgement sent to the offload node is associated with a reward.

19. The server according to claim 17, wherein the offload management system is arranged to
- examine, on the basis of the checked offload request, whether the offload request has been expired; and if yes,
- disqualify the offload request and send an acknowledgement to the origin of the offloaded piece of data and to the offload node.

20. The server according to claim 17, wherein the offload management system is arranged to
- upon noticing that the reception of the offload has not been completed prior to the expiration of the timer,
- disqualify the offload request and send an acknowledgement to the origin of the offloaded piece of data and to the offload node.

* * * * *